Patented Mar. 21, 1950

2,501,149

UNITED STATES PATENT OFFICE 2,501,149

METHODS OF TREATING BITUMINOUS MATERIALS

Kinloch N. Yellott, Cockeysville, Md., assignor to Western Electric Company, Incorporated, New York, N. Y., a corporation of New York No Drawing. Application March 26, 1946, Serial No. 657,353

17 Claims. (Cl. 196—22)

This invention relates to methods of treating bituminous materials, and particularly to methods of making bituminous compositions containing natural asphaltic materials which are suitable for incorporation in vulcanizable compounds of rubber or synthetic rubber-like materials.

This application is a continuation-in-part of my copending application Serial No. 571,547, filed January 5, 1945, now abandoned, for "Methods of blending bituminous compositions."

It has been suggested in the past that certain hard, natural asphaltic materials, such as gilsonite, be used as fillers or spreaders for vulcanizable compounds, in which rubber, or synthetic rubber-like materials, or mixtures thereof, comprised the vulcanizable constituent. However, the use of such asphaltic materials for this purpose has been limited heretofore because it is extremely difficult to incorporate them in vulcanizable compounds.

In copending applications of T. K. Cox, Serial No. 571,541, filed January 5, 1945, now abandoned, Serial No. 657,338, filed March 26, 1946, and Serial No. 657,339, filed March 26, 1946, now abandoned, there are described and claimed certain new bituminous compositions comprising hard, natural asphaltic materials, or derivatives thereof, blended with microcrystalline waxes and paraffin and, in some cases, blends of such asphaltic materials, or derivatives, and microcrystalline waxes without paraffin. It has been found that such materials cannot be blended indiscriminately, if uniform and satisfactory results are desired, because the time of heating, temperature at which heated and the sequence in which the ingredients are mixed have a marked influence on the character of the blended products.

It is an object of this invention to provide new and useful processes of treating bituminous materials.

Another object of the invention is to provide new and useful processes of blending derivatives of hard, natural asphaltic materials with waxy materials, such as microcrystalline waxes and paraffin.

In accordance with one method embodying the invention, a derivative of hard, natural asphaltic material, such as gilsonite, is produced and the resulting product is blended with microcrystalline waxes and paraffin. This is accomplished by heating a mass of the asphaltic material for a period of time and at a predetermined rate to a temperature sufficiently high to melt it, but not high enough to burn, carbonize or char it, or to drive off too large amounts of the volatile constituents thereof, and continuing the heating until a predetermined amount of volatile materials is distilled from the asphaltic material, whereby a derivative of the asphaltic material is produced. Then the heating of the mass is discontinued and microcrystalline waxes and paraffin are added successively to the mass of asphaltic derivative as it cools, meanwhile stirring the mixture to insure uniform blending.

Specific examples will be given of methods of making bituminous compositions in which gilsonite is the hard, natural asphaltic material employed as a starting material. However, it will be understood that these examples are merely illustrative of the invention and that the invention embraces all methods and materials falling within the terms of the annexed claims.

Gilsonite as it occurs in nature is a hard, brittle, friable material with a comparatively high softening point. While it can be pulverized without great difficulty, the action of conventional mixers used to prepare vulcanizable compounds does not reduce particles of gilsonite to a degree of fineness sufficient to cause it to be dispersed uniformly in such compounds. The softening point of gilsonite is so high and the usual time taken to complete such mixing operations is so short that the gilsonite is not liquefied and caused to be distributed evenly throughout such vulcanizable compounds. The methods embodying the invention provide means by which a gilsonite derivative having a softening point below the softening point of gilsonite can be prepared. The resulting derivative may be blended with waxy materials in accordance with the invention to produce bituminous compositions which blend readily with other ingredients of vulcanizable rubber or rubber-like compositions to form products having uniform properties.

It is known that gilsonite, as commercially available, contains small proportions of extraneous matter, usually less than 1% of non-mineral insoluble matter and less than 1% of mineral matter. It is desirable to remove such materials before blending the gilsonite with waxy materials. Furthermore, when vulcanizable compounds containing gilsonite were employed heretofore as insulation for electrical conductors and the insulating compound was vulcanized on a conductor by vulcanization processes known to the art, such as by continuous vulcanization in high pressure steam, the gilsonite was heated to a temperature at which a substantial quantity of volatile materials was distilled therefrom. The evolution of such distilled materials had a deleterious effect upon the insulating compound, since it tended to produce porosity and to cause blistering in the compound.

In accordance with this invention, before the gilsonite is blended with waxy materials, it is heated to a temperature at least as high, and preferably higher, than the highest temperature to which vulcanizable compounds containing it would be subjected during a subsequent vulcanization process, in order to remove therefrom the volatile materials that would be evolved at the vulcanization temperature. The temperature and time of heating the gilsonite are carefully correlated and controlled so that substantially the same amount of volatile materials is driven off from each batch of gilsonite treated.

The invention will be understood fully from the following description of specific embodiments of the invention, which are presented for the purpose of illustration only and not to limit the scope of the invention as defined in the annexed claims.

Example I

One specific bituminous composition that was prepared in accordance with methods embodying the invention consisted of the following materials in the proportions recited:

|  | Per cent |
|---|---|
| Gilsonite derivative | 86.45 |
| Microcrystalline waxes ("Heliozone") | 5.55 |
| Paraffin | 8.00 |
| Total | 100.00 |

The gilsonite derivative used may be prepared and the several ingredients may be blended uniformly by introducing a mass of gilsonite into a melting kettle large enough to hold a quantity thereof substantially in excess of a predetermined weight. The gilsonite used preferably is a commercial grade containing only a small amount of extraneous matter, since such a material is easier to treat than are materials of lower quality. A suitable material is the product known as "Gilsonite Selects," or one having comparable properties, although almost any commercial variety of gilsonite can be employed.

Assuming, for example, that it is desired to make a 1,000 pound batch of the bituminous composition indicated above, a kettle large enough to hold at least 1700 pounds of gilsonite is filled about half full of solid processed gilsonite. Heat is gradually applied to the kettle to melt the gilsonite and the heating is continued until the mass reaches a temperature of about 625° F. The mass is stirred constantly by means of a suitable mechanical stirrer to avoid overheating or burning of the gilsonite.

When the temperature of the mass is about 625° F., approximately 865 pounds of cold gilsonite are added to the molten gilsonite in the kettle. The temperature of the molten gilsonite is reduced by the addition of this cold material and the heating is continued until the whole is brought to a temperature of about 625° F., the material being stirred thoroughly in the meanwhile. As soon as the temperature again reaches about 625° F., a batch of the molten material weighing about 865 pounds is drawn off into a blending kettle and a second charge of processed gilsonite weighing approximately 865 pounds is added to the melting kettle. The heat supplied to the melting kettle is so controlled that it requires about 70 minutes to raise the temperature of each cold charge of gilsonite to about 625° F. This treatment drives off a desired amount of volatile materials from the gilsonite and produces a gilsonite derivative having properties somewhat different from those of the original gilsonite.

The molten gilsonite derivative that is drawn off into the mixing kettle is allowed to cool to a temperature of about 580° F., when a batch of the microcrystalline waxes weighing about 55 pounds is added. The waxes melt at that temperature and as soon as the added batch melts it is stirred into the molten gilsonite until a uniform mixture results. This mixture is allowed to cool to a temperature of about 475° F. and about 80 pounds of paraffin then are added thereto. Since the melting point of the paraffin is below that temperature, it melts rapidly and, when molten, it is stirred thoroughly into the other ingredients. The resulting blended product is placed in suitable containers while still molten and permitted to cool and solidify therein. These steps are repeated for each batch of molten gilsonite derivative withdrawn from the kettle to prepare successive batches of bituminous compositions.

When this procedure is followed, the respective components of the bituminous composition are blended together uniformly and the resulting composition may be incorporated readily in vulcanizable compounds, such as insulating compounds containing rubber or synthetic rubber-like materials. Such bituminous compositions are dispersible in buna insulating compounds, particularly those made of Buna S, much more easily than natural, unheated gilsonite, the gilsonite derivatives described hereinabove, or other bituminous mixtures, can be incorporated therein. Also bituminous compositions of this nature, which have been blended in accordance with the invention possess uniform physical properties despite some lack of uniformity that occurs in the individual ingredients thereof.

One reason for the uniformity in the quality of these blended bituminous compositions is the fact that the heating cycle of each batch of gilsonite is so controlled that the same amount of the volatile portions of the gilsonite is driven off from each melt. Since different lots of gilsonite vary somewhat, this process provides a means of avoiding wide variations in the finished product.

Another advantage of keeping a mass of molten gilsonite in the melting kettle at all times after the initial lot has been melted is that overheating or burning of the gilsonite is avoided. If solid gilsonite is introduced into a hot kettle, or the temperature of a kettle is raised too rapidly, there is danger of local overheating of the gilsonite caused by contact of the gilsonite with the sides of the hot kettle. This is especially likely to occur before the gilsonite becomes molten and the heat transfer caused by stirring is not effective fully. Also, care is taken to prevent excessive distillation of the volatile materials in the gilsonite.

During the heating step, any ingredients in the original gilsonite which have melting points higher than 625° F. remain unmelted and settle to the bottom of the kettle. In drawing off the successive batches of gilsonite derivative, care is taken to leave undisturbed the material found in the lowermost several inches in the bottom of the kettle, since the insoluble and unmelted materials will collect in that layer. After the operation has continued for some period of time, all the material except that present in about the last five or six inches in the bottom of the kettle is withdrawn and the material left in the kettle is then discarded. A fresh batch of gilsonite is then placed in the kettle, and the operations described hereinabove are resumed. By following this procedure, the treated gilsonite is freed from the deleterious extraneous matter consisting principally of insoluble, nonmineral matter and mineral matter.

It has been found that by heating gilsonite to a temperature of about 625° F. and controlling the heating step so that the gilsonite is brought to this temperature over a period of about 70 minutes, all the material that would volatilize from the gilsonite during the usual vulcanization processes is distilled therefrom. It appears that methane is the principal constituent of the volatile materials removed by such distillation. Analyses of the material before and after such treatment indicate that the amount of volatile materials driven off is at least about 2% but does not exceed about 5% of the weight of the original material. Preferably the amount of the volatile materials removed is from about 2.75% to about 3.25% of the original material, and the optimum amount to be driven off appears to be about 3% or just slightly thereover.

The product resulting from this selective distillation is, in effect, a derivative of gilsonite, since an examination of the material thus produced reveals that it differs materially from the original gilsonite in several respects. These differences are shown in the following table, which outlines the results of tests made on one sample of gilsonite derivative produced in accordance with the invention:

| | Gilsonite | Gilsonite Derivative |
|---|---|---|
| Specific Gravity | 1.03 | 1.038 |
| Softening Point (R & B Method) | 272° F. | 256° F. |
| Comparative physical characteristics | | |
| Slight softening | 100° C. | 98° C. |
| Distinct softening | 103° C. | 101° C. |
| Starts to lose form | 109° C. | 103° C. |
| Distinct slump | 117° C. | 107° C. |
| Loses shape entirely | 121° C. | 113° C. |

It is apparent from this table that the softening point of the gilsonite derivative is 16° F. below that of the untreated material. By following processes embodying the invention, gilsonite derivatives may be produced that have softening points down to about 20° F. lower than that of gilsonite as it occurs in nature. When gilsonite is treated as described hereinabove, the resulting gilsonite derivative usually has a softening point from about 15° F. to about 20° F. less than that of the original gilsonite.

Some of the undesirable characteristics of naturally occurring gilsonite are overcome by treating the gilsonite as described hereinabove to remove the inert extraneous matter and to drive off those portions of the gilsonite that would volatilize under the conditions present in vulcanization processes. However, even though the softening points of the gilsonite derivatives resulting from such treating may be materially lower than that of the original gilsonite, such a gilsonite derivative still has a softening point too high to permit it to be incorporated readily in vulcanizable compounds, particularly those compounds containing Buna S as the vulcanizable constituent. This difficulty is overcome by incorporating in the gilsonite derivatives produced by the above-described treatment microcrystalline waxes and paraffin in such proportions that the resulting products have softening points not exceeding about 240° F., and preferably in the vicinity of about 205° F.±10° F., with the compounds having at the same time the least possible diminution in their hardness at temperatures below about 160° F.

Example II

Another bituminous composition that has been blended by practicing a method embodying the invention consisted of the ingredients listed below in the following proportions:

| | Per cent |
|---|---|
| Gilsonite derivative | 85.3 |
| Paraffin | 11.0 |
| Microcrystalline waxes ("Heliozone") | 3.7 |
| Total | 100.0 |

These materials were blended in substantially the same manner as has been described in Example I, except that the relative proportions thereof were varied to make a blended product having this formula. About 853 pounds of the gilsonite derivative obtained from "Gilsonite Selects" that has previously been heated in a melting kettle, as described hereinabove, to temperature of about 625° F. to drive off a predetermined quantity of volatile materials, were withdrawn from the molten mass in the melting kettle and placed in a mixing kettle. The gilsonite derivative was allowed to cool in the mixing kettle to about 580° F., whereupon about 110 pounds of "Heliozone" were added and mixed thoroughly into the molten material. When the resulting mixture had cooled still further to a temperature of about 475° F., the paraffin component weighing about 37 pounds was introduced and stirred into the other ingredients.

The resulting product comprised a uniform blend of these several ingredients, which is especially suitable for incorporation in insulating compounds. Successive batches made in this manner have substantially identical properties and, in consequence, users thereof in making vulcanizable compounds would not have to vary their formulae to compensate for variations in the bituminous compositions.

When practicing methods embodying the invention, the microcrystalline waxes and paraffin are added to the molten gilsonite derivative while the latter is cooling, in order to avoid excessive loss thereof by distillation. They should not be subjected to any more heat than is required to permit them to be melted and incorporated thoroughly in the gilsonite derivative, and the waxy ingredients preferably are added successively in the inverse order of their melting points.

Within these limitations there is considerable latitude in the choice of processing procedures. For example, heating the gilsonite at a lower temperature for a longer period of time gives results comparable to those obtained by employing a temperature of about 625° F. for the period indicated hereinabove. Likewise, substantially the same results are obtained when a higher temperature is used for a shorter interval. Also, the gilsonite could be heated at a lower temperature under reduced pressure, for example in a vacuum still, with comparable results.

Some distillation of volatile matter occurs whenever gilsonite is heated in an open kettle to a temperature above 200° F. and such distillation takes place to some extent throughout the period that the gilsonite is kept molten. Consequently, the conditions, such as the time, temperature and pressure, under which the gilsonite is treated are so correlated that the amount of such distillation that occurs is substantially the same no matter what temperature is employed. As a result, the successive batches of blended product are practically identical in composition and properties.

Obviously, some variation is permissible in the processing temperatures and time intervals described. The gilsonite should be heated to a temperature of at least about 450° F., since it has been found that when gilsonite has been heated to at least that temperature, the properties of the blended bituminous compositions are improved. It is preferable to heat the gilsonite to a temperature of at least about 550° F. because the ebullition which occurs is most vigorous at temperatures up to about 550° F. and subsides above that temperature. When gilsonite is so heated, subsequent reheating thereof will not cause a repetition of the ebullition, whereas, when gilsonite that has been heated to a temperature below about 550° F. is reheated, the ebullition reoccurs.

The gilsonite should not be heated much above about 640° F. because of the danger of burning or carbonizing it and because distillation of the volatile materials in the gilsonite takes place much more rapidly at temperatures above 640° F. than at lower temperatures. Rapid distillation of these materials makes it more difficult and expensive to practice the process of the invention in such a manner as to achieve uniformity in the finished product. It is possible to operate the process successfully when the gilsonite is heated above 640° F., but when this is done, a much more exact control of the time-temperature cycle must be observed in order to avoid variation between diffferent batches of the blended product.

The gilsonite should not be heated much above about 500° F. for a prolonged period because prolonged heating, especially at higher temperatures, causes the softening point of the gilsonite derivative to rise, which is undesirable. As shown hereinabove, the softening point of a gilsonite derivative produced in accordance with the invention may be from about 15° F. to about 20° F. lower than that of the original gilsonite from which it was obtained. However, if the heating is continued too long, particularly at elevated temperatures, the softening point starts to rise and may reach a value considerably higher than that of the original gilsonite, which obviously would defeat the purpose of the invention. It appears that some cracking of the constituents of the gilsonite occurs when it is heated as described, and the volatile matter driven therefrom apparently includes some products that result from destructive distillation of the gilsonite.

Obviously, it is not necessary to add the waxy materials to the gilsonite derivative immediately after such derivative is withdrawn from the vessel in which it is formed. If desired, after the gilsonite has been heated under the conditions necessary to remove therefrom a predetermined amount of volatile material, it may be allowed to solidify and later on may be remelted and blended with the waxy materials substantially as described hereinabove. In reheating the gilsonite derivative, the same care should be taken to avoid charing or burning it that was exercised in heating the gilsonite originally.

The temperatures at which the microcrystalline waxes and paraffin and the order in which they are added may be varied, although the best results are obtained when the higher melting microcrystalline waxes are added before the paraffin is added. These waxy materials should be added successively at temperatures at which they melt quickly but do not volatilize readily in order to minimize distillation thereof. It is impossible to avoid some distillation of these waxy materials and each one of them is always added at the particular temperature selected for its addition to insure constancy in the amount thereof that is distilled off. The observance of these procedures also contributes to the production of consistently uniform products.

While processes have been described in which the materials blended have been a gilsonite derivative, paraffin and a certain type of microcrystalline waxes, it is obvious that the invention embraces processes in which other materials are treated in a similar manner and are combined in the same or different proportions. Thus, for example, glance pitch or other hard, natural asphaltic materials may be substituted in whole or in part for the gilsonite.

The microcrystalline waxes used are waxes derived from petroleum, which exists in the form of minute but clearly defined crystals. "Heliozone" is a blend of microcrystalline waxes containing a small amount of paraffin and melts at about 152° F. to about 156° F. This product is sold by E. I. du Pont de Nemours and Company, of Wilmington, Delaware. Another similar material is that sold by the Naugatuck Chemical Company, of Naugatuck, Connecticut, under the trade name "Sunproof." A pure microcrystalline wax blend having a melting point of about 162° F. that may be used is "Antisol," which is sold by Herron Bros. & Meyer, of New York, N. Y.

Other similar microcrystalline waxes having higher or lower melting points, or mixtures of such waxes, may be employed, if desired, and a part of all of the paraffin may be replaced by microcrystalline waxes. As pointed out previously, care must be taken that the proper temperatures are chosen for the addition of these waxy materials to the molten gilsonite. Manifestly, when no paraffin is employed, the step of adding and mixing this material is omitted. In that case, the one addition of the microcrystalline waxes to the gilsonite is the only one made, unless a plurality of microcrystalline waxes having different melting points are employed, in which event, the different waxes may be added separately in the decreasing order of their melting points.

Satisfactory results are obtained when bituminous compositions made by methods embodying the invention comprise from about 80% to about 90% of a hard, natural asphaltic material, from about 2% to about 10% of microcrystalline waxes and from about 3% to about 15% of paraffin. The best results are obtained when the amount of microcrystalline waxes plus paraffin is from about 10% to about 20% of the total blended composition, and when the amount of microcrystalline waxes employed is from about ¼ to about ¾ of the paraffin used. A preferred composition is one in which the range of microcrystalline waxes plus paraffin is from about 11% to about 17% of the total blended bituminous composition, and the balance is a gilsonite derivate produced as described hereinabove. These proportions may be varied somewhat, while, as stated previously, the paraffin may be replaced in whole or in part by microcrystalline waxes.

For some purposes, it may be desirable to make a uniform blend of paraffin and a derivative of a hard, natural asphaltic material, such as gilsonite, without including any microcrystalline waxes. In that case the same general procedure is followed except that no waxy material is added to the molten asphaltic derivative until the temperature of the latter has dropped to a point where paraffin melts quickly, but does not vaporize easily. The addition of the paraffin at a temperature not exceeding about 500° F. is preferred.

From the foregoing description it is apparent that this invention provides simple and economical methods of treating bituminous materials to produce derivatives thereof which constitute a starting material from which extremely useful bituminous compositions may be obtained. Bituminous compositions made by practicing methods embodying the invention are homogeneous and have extremely uniform compositions and properties.

It is to be understood that the terms "volatile matter," "volatile materials," and "volatile constituents," or words of similar import, as used herein and in the annexed claims, are intended to embrace any volatile materials that may be present in the gilsonite originally and any volatile materials produced by cracking or destructive distillation of the gilsonite.

What is claimed is:

1. The method of making bituminous compositions, which comprises heating a mass of gilsonite to a temperature of about 625° F., allowing the mass to cool to a temperature of about 580° F., incorporating in the molten material a predetermined quantity of microcrystalline waxes, allowing the resulting mixture to cool to a temperature of about 475° F., and then incorporating in the resulting mixture, a predetermined quantity of paraffin.

2. The method of making bituminous compositions, which comprises heating a mass of gilsonite to a temperature of at least about 450° F. but not substantially in excess of about 640° F., allowing the mass to cool to a temperature at which it is still molten and microcrystalline waxes melt quickly without substantial vaporization, adding a predetermined quantity of microcrystalline waxes to the molten mass, allowing the resulting mixture to cool further to a temperature at which the mixture is still molten and paraffin melts quickly without substantial vaporization, and then adding a predetermined quantity of paraffin to the mixture.

3. The method of making bituminous compositions, which comprises heating a mass of gilsonite to a temperature in excess of 550° F. until the mass is molten, adding to the molten mass a batch of cold gilsonite of predetermined weight, continuing the heating until the added batch is melted and the resulting molten mass reaches a temperature of from about 550° F. to about 640° F., withdrawing an amount of the molten mass substantially equal to the added batch, allowing the withdrawn material to cool, sequentially incorporating in the withdrawn material predetermined quantities of microcrystalline waxes and paraffin, and repeating all but the first of the foregoing steps, the temperature and time of heating each batch of the gilsonite being so correlated that the amount of volatile materials distilled from the gilsonite is substantially constant at a value not exceeding about 5% of the original weight of the batch and the microcrystalline waxes and paraffin being always added at the same respective temperatures whereby the amounts of each distilled off is substantially constant.

4. The method of making bituminous compositions, which comprises heating a mass of gilsonite to a temperature of about 625° F., allowing the mass to cool to a temperature of about 580° F., adding to and stirring into the molten material a predetermined quantity of microcrystalline waxes, allowing the resulting mixture to cool to a temperature of about 475° F., and then adding to and stirring into the resulting mixture a predetermined quantity of paraffin, the constituents being combined in such quantities as to produce a bituminous composition comprising from about 80% to about 90% of heat treated gilsonite, from about 2% to about 10% of microcrystalline waxes and from about 3% to about 15% of paraffin.

5. The method of making bituminous compositions, which comprises heating a mass of gilsonite until it reaches a temperature in excess of 500° F. but not substantially in excess of about 640° F., the heating step being performed over a period sufficient to drive off a predetermined, appreciable quantity not exceeding about 5% of volatile constituents from the gilsonite, discontinuing heating the resulting molten material, and adding microcrystalline waxes and paraffin successively in the order named to the molten material as it cools, meanwhile stirring the mixture to insure uniform blending of the constituents thereof.

6. The method of making bituminous compositions consisting of at least about 80% of gilsonite derivative and the balance microcrystalline waxes and paraffin, which comprises heating gilsonite until it reaches a temperature in excess of 600° F. but not substantially in excess of about 640° F., the heating step being performed over a period sufficient to drive off a predetermined, appreciable quantity of volatile constituents from the gilsonite, discontinuing heating the gilsonite, adding a predetermined quantity of microcrystalline waxes to the resulting gilsonite derivative when it has cooled to a temperature below 600° F., and adding a predetermined quantity of paraffin to the resulting mixture when the mixture has cooled to a temperature below 500° F., the materials being stirred throughout the operation.

7. The method of making bituminous compositions consisting principally of a gilsonite derivative and containing microcrystalline waxes and paraffin, which comprises heating gilsonite until it reaches a temperature in excess of 550° F. but not substantially in excess of about 640° F., the heating step being performed over a period sufficient to drive off from the gilsonite a predetermined quantity of volatile constituents comprising at least about 2% but not exceeding about 5% of the original gilsonite, discontinuing heating the resulting product, and adding the microcrystalline waxes and paraffin successively in the order named to the product as it cools, meanwhile stirring the mixture to insure uniform blending of the constituents thereof.

8. The method of making bituminous compositions consisting of at least about 80% of a gilsonite derivative and the balance microcrystalline waxes and paraffin, which comprises heating gilsonite until it reaches a temperature in excess of 600° F. but not substantially in excess of about 640° F., the heating step being performed over a period sufficient to drive off from the gilsonite a predetermined quantity of volatile constituents comprising at least about 2% but not exceeding about 5% of the original gilsonite, discontinuing heating the resulting product, adding a predetermined quantity of microcrystalline waxes thereto when it has cooled to a temperature below 600° F., and adding a predetermined quantity of paraffin to the resulting mixture when the mixture has cooled to a temperature below 500° F., the materials being stirred throughout the operation.

9. The method of making bituminous compositions consisting of at least 80% gilsonite derivative and the balance microcrystalline waxes and paraffin, which comprises heating a mass of gilsonite to a temperature of about 625° F., simultaneously stirring the mass, adding to the molten mass a batch of gilsonite of predetermined weight, continuing the heating and stirring until the added batch is melted and the resulting molten mass reaches a temperature of about 625° F., controlling the heat supplied after the batch has been added so that the molten mass reaches said temperature in about 70 minutes, withdrawing an amount of the resulting molten mass substantially equal to the added batch, allowing the withdrawn material to cool to a temperature of about 580° F., adding to and stirring into the withdrawn material a predetermined quantity of microcrystalline waxes, allowing the resulting mixture to cool to a temperature of about 475° F., then adding to and stirring into the resulting mixture a predetermined quantity of paraffin, and repeating all but the first of the foregoing steps.

10. The method of making bituminous compositions consisting of at least about 80% of a gilsonite derivative and the balance microcrystalline waxes and paraffin, which comprises heating a mass of cold gilsonite until it reaches a temperature of about 625° F., controlling the heat supplied to the gilsonite during such heating so that said temperature is reached in about 70 minutes, discontinuing heating the resulting gilsonite derivative, adding a predetermined quantity of microcrystalline waxes thereto when it has cooled to a temperature below 600° F., and adding a predetermined quantity of paraffin to the resulting mixture when the mixture has cooled to a temperature below 500° F., the materials being stirred throughout the operation.

11. The method of making a bituminous composition, which comprises heating a mass of gilsonite derivative to a temperature of at least 600° F., allowing the mass to cool, and while the mass is cooling but still molten adding thereto predetermined quantities of microcrystalline waxes and paraffin in the inverse order of their melting points, the gilsonite derivative employed constituting at least 80% of the composition and being the product obtained by distilling a predetermined quantity not exceeding 5% of volatile constituents from gilsonite.

12. The method of making a bituminous composition, which comprises heating a mass of a gilsonite derivative to a temperature of about 625° F., allowing the mass to cool to a temperature of about 580° F., incorporating in the gilsonite derivative a predetermined quantity of microcrystalline waxes, allowing the resulting mixture to cool to a temperature of about 475° F., and then incorporating in the resulting mixture a predetermined quantity of paraffin, the gilsonite derivative employed being the principal ingredient of the composition and being the product obtained by distilling from gilsonite a predetermined quantity of volatile constituents not exceeding about 5% by weight of the original gilsonite.

13. The method of making bituminous compositions, which comprises heating a mass of a gilsonite derivative to a temperature of about 625° F., allowing the mass to cool to a temperature of about 580° F., adding to and stirring into the gilsonite derivative a predetermined quantity of microcrystalline waxes, allowing the resulting mixture to cool to a temperature of about 475° F., and then adding to and stirring into the resulting mixture a predetermined quantity of paraffin, the gilsonite derivative, microcrystalline waxes and paraffin being combined in such quantities as to produce a bituminous composition comprising from about 80% to about 90% of gilsonite derivative, from about 2% to about 10% of microcrystalline waxes and from about 3% to about 15% of paraffin and the gilsonite derivative employed being the product obtained by distilling from gilsonite a predetermined quantity of volatile constituents constituting at least about 2% but not exceeding about 5% by weight of the original gilsonite.

14. The method of making bituminous compositions, which comprises heating a mass of natural, hard asphaltic material having a softening point not materially exceeding about 475° F. at a temperature sufficiently above its melting point and for a period sufficiently long to remove therefrom a substantial quantity of gaseous matter, causing the mass to reach a temperature at which it is still molten and microcrystalline waxes melt quickly without substantial vaporization, adding a predetermined quantity of microcrystalline waxes to the molten mass, allowing the resulting mixture to cool to a temperature at which the mixture is still molten and paraffin melts quickly without substantial vaporization, and then adding a predetermined quantity of paraffin to the mixture.

15. The method of treating bituminous materials, which comprises heating a mass of a natural asphaltic material of the group consisting of gilsonite and glance pitch at a temperature in excess of about 600° F. until a sufficient quantity of gaseous matter has been removed therefrom to materially lower the softening point thereof, allowing the mass to cool to a temperature at which it is still molten and microcrystalline waxes melt quickly without substantial vaporization, adding a predetermined quantity of microcrystalline waxes to the molten mass, allowing the resulting mixture to cool further to a temperature at which the mixture is still molten and paraffin melts quickly without substantial vaporization, and then adding a predetermined quantity of paraffin to the mixture.

16. The method of making bituminous compositions, which comprises heating a mass of gilsonite derivative to a temperature of at least about 450° F. but not substantially in excess of about 640° F., allowing the mass to cool to a temperature at which it is still molten and microcrystalline waxes melt quickly without substantial vaporization, adding a predetermined quantity of microcrystalline waxes to the molten mass, allowing the resulting mixture to cool further to a temperature at which the mixture is still molten and paraffin melts quickly without substantial vaporization, and then adding a predetermined quantity of paraffin to the mixture, the gilsonite derivative employed being natural gilsonite freed from substantially all material that volatilizes at a temperature of at least 450° F.

17. The method of making a bituminous composition, which comprises heating a mass of gilsonite derivative to a temperature of about 625°

F. allowing the mass to cool, and while the mass is cooling successively adding thereto microcrystalline waxes and paraffin in the inverse order of their melting points, the gilsonite derivative employed constituting at least 80% of the composition and being gilsonite freed of a quantity of volatile material equal to from 2% to 5% of its original weight.

KINLOCH N. YELLOTT.

REFERENCES CITED

The following references are of record in the file of this patent:

UNITED STATES PATENTS

| Number | Name | Date |
|---|---|---|
| 415,864 | Gilson | Nov. 26, 1889 |
| 768,101 | Whitall | Aug. 23, 1904 |
| 877,888 | Forrest | Jan. 28, 1908 |
| 2,015,739 | Winning | Oct. 1, 1935 |
| 2,069,314 | Hunt et al. | Feb. 2, 1937 |
| 2,127,668 | Adams et al. | Aug. 23, 1938 |
| 2,291,905 | Koenig | Aug. 4, 1942 |
| 2,299,144 | Heritage et al. | Oct. 20, 1942 |
| 2,325,085 | Vore | July 27, 1943 |
| 2,361,582 | Adams et al. | Oct. 31, 1944 |

OTHER REFERENCES

Abraham: "Asphalts and Allied Substances," fourth edition, pages 230, 484, 491 and 492; pub. by D. Van Nostrand Co., New York, 1938.